(12) United States Patent
Kapish et al.

(10) Patent No.: US 11,544,138 B2
(45) Date of Patent: Jan. 3, 2023

(54) FRAMEWORK FOR ANOMALY DETECTION AND RESOLUTION PREDICTION

(71) Applicant: Dell Products L.P., Round Rock, TX (US)

(72) Inventors: Kanika Kapish, Muzaffarnagar (IN); Hung Dinh, Austin, TX (US); Bijan Kumar Mohanty, Austin, TX (US); Rômulo Teixeira de Abreu Pinho, Niterói (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/332,362

(22) Filed: May 27, 2021

(65) Prior Publication Data
US 2022/0382611 A1    Dec. 1, 2022

(51) Int. Cl.
*G06F 11/07*    (2006.01)
(52) U.S. Cl.
CPC ...... *G06F 11/0793* (2013.01); *G06F 11/0709* (2013.01); *G06F 11/079* (2013.01); *G06F 11/0778* (2013.01)
(58) Field of Classification Search
CPC ............. G06F 11/0709; G06F 11/0778; G06F 11/079; G06F 11/0793
See application file for complete search history.

(56) References Cited

U.S. PATENT DOCUMENTS

| | | | |
|---|---|---|---|
| 10,565,077 B2 * | 2/2020 | Hayden | G06F 11/2257 |
| 2019/0347148 A1 * | 11/2019 | Gomes Pereira | G06K 9/623 |
| 2020/0042373 A1 * | 2/2020 | Przestrzelski | G06F 11/0709 |
| 2020/0341830 A1 * | 10/2020 | Bangad | G06F 11/0772 |

OTHER PUBLICATIONS

Azure Devops Labs, "Monitoring Applications using Application Insights," https://azuredevopslabs.com/labs/vsts/monitor/, Mar. 5, 2021, 20 pages.
DNS Stuff, "SNMP Traps Explained: How to View SNMP Traps," https://www.dnsstuff.com/snmp-traps-explained-how-to-view#:~:text=The SNMP manager monitors devices,such as a device overheating, Oct. 16, 2020, 6 pages.
google.com, "Devices, Configuration, and State," https://cloud.google.com/iot/docs/concepts/devices, May 12, 2021, 9 pages.
Wikipedia, "IT Service Management," https://en.wikipedia.org/w/index.php?title=IT_service_management&oldid=1019175413, Apr. 21, 2021, 4 pages.
Wikipedia, "Simple Network Management Protocol," https://en.wikipedia.org/w/index.php?title=Simple_Network_Management_Protocol&oldid=1018449717, Apr. 18, 2021, 13 pages.

* cited by examiner

*Primary Examiner* — Joseph R Kudirka
(74) *Attorney, Agent, or Firm* — Ryan, Mason & Lewis, LLP

(57) ABSTRACT

A method comprises collecting operational data for one or more devices and identifying one or more anomalies associated with the one or more devices based at least in part on the collected operational data. At least a portion of the collected operational data corresponding to the identified one or more anomalies is analyzed, and a probability of automatic resolution for respective ones of the identified one or more anomalies is determined based at least in part on the analysis. The identifying, the analyzing and the determining are performed using one or more machine learning models.

20 Claims, 8 Drawing Sheets

FRAMEWORK FOR ANOMALY DETECTION AND RESOLUTION PREDICTION

FIELD

The field relates generally to information processing systems, and more particularly to anomaly detection and resolution prediction of anomalous events.

BACKGROUND

In an effort to achieve fault-tolerance, enterprise and consumer devices may be equipped with a variety of systems to detect and monitor device behavior and parameters. Data corresponding to errors or other failure events typically drives the generation of alerts by such detection and monitoring systems. In addition, logging and auditing of the events may be performed. Alerts may be automatically generated and sent to downstream systems for case and incident creation in, for example, customer relationship management (CRM) and information technology service management (ITSM) systems. Agents of these systems may troubleshoot the devices, diagnose the issues and find appropriate resolutions. Such resolutions may be, for example, software-based (e.g., driver, patch and other system software solutions) and/or hardware-based (e.g., replacing faulty parts).

SUMMARY

Illustrative embodiments provide techniques to use machine learning to predict the automatic resolution of anomalous events.

In one embodiment, a method comprises collecting operational data for one or more devices and identifying one or more anomalies associated with the one or more devices based at least in part on the collected operational data. At least a portion of the collected operational data corresponding to the identified one or more anomalies is analyzed, and a probability of automatic resolution for respective ones of the identified one or more anomalies is determined based at least in part on the analysis. The identifying, the analyzing and the determining are performed using one or more machine learning models.

These and other illustrative embodiments include, without limitation, methods, apparatus, networks, systems and processor-readable storage media.

DETAILED DESCRIPTION

Figure 1:
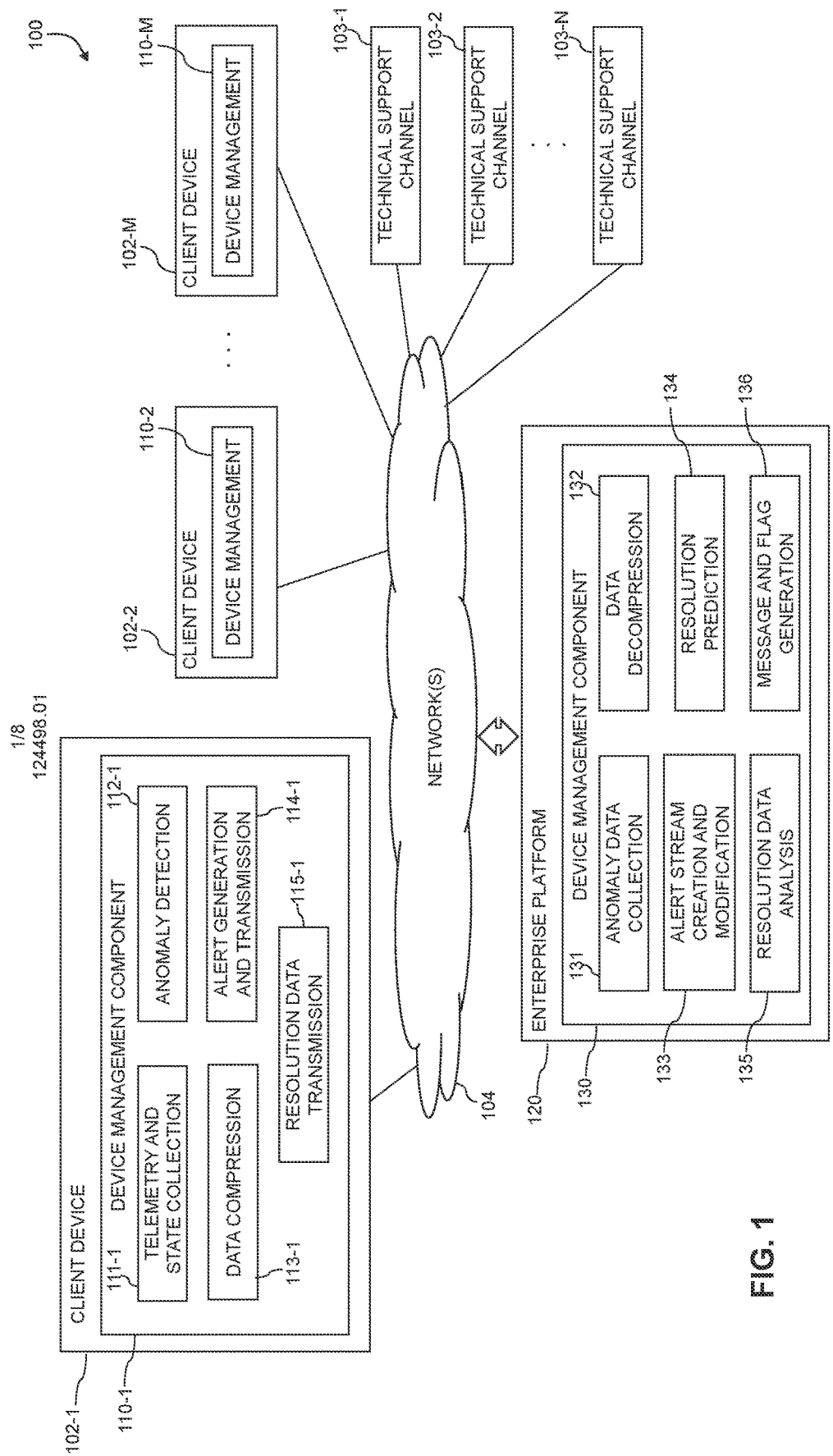
FIG. 1 depicts details of an information processing system with client and enterprise device management components for detecting anomalous events and predicting resolution of the anomalous events according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

In illustrative embodiments, device support processes periodically collect large amounts of telemetry and state data corresponding to various device attributes and generate alerts for anomalous events, which can result in the opening of technical support tickets and/or cases to address the anomalous event. Under conventional approaches, when an anomaly automatically corrects itself and a device reverts to a normal state, no new alerts are generated, causing support tickets and/or cases for anomalous events to remain open until an agent analyzes and identifies that the problematic issue no longer exists. Advantageously, the embodiments determine if an event has been automatically resolved, and issue notifications to enterprise device management components about the automatic resolution to avoid the creation or continued existence of unnecessary support requests. Additionally, in illustrative embodiments, an intelligent adaptive anomaly detection framework detects anomalous events, and uses machine learning techniques to predict whether an anomalous event will be automatically resolved, thereby reducing the creation of unnecessary support cases or tickets, and lowering support costs.

FIG. 1 shows an information processing system 100 configured in accordance with an illustrative embodiment. The information processing system 100 comprises client devices 102-1, 102-2, . . . 102-M (collectively "client devices 102"). The client devices 102 communicate over a network 104 with an enterprise platform 120.

The client devices 102 can comprise, for example, Internet of Things (IoT) devices, desktop, laptop or tablet computers, mobile telephones, or other types of processing devices capable of communicating with the enterprise platform 120 and each other over the network 104. Such devices are examples of what are more generally referred to herein as "processing devices." Some of these processing devices are also generally referred to herein as "computers." The client devices 102 may also or alternately comprise virtualized computing resources, such as virtual machines (VMs), containers, etc. The client devices 102 in some embodiments comprise respective computers associated with a particular company, organization or other enterprise. The variable M and other similar index variables herein such as K, L and N are assumed to be arbitrary positive integers greater than or equal to two.

The terms "client", "customer" or "user" herein are intended to be broadly construed so as to encompass numerous arrangements of human, hardware, software or firmware entities, as well as combinations of such entities. Device management services may be provided for users utilizing one or more machine learning models, although it is to be appreciated that other types of infrastructure arrangements could be used. At least a portion of the available services and functionalities provided by the client devices 102 and the enterprise platform 120 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the enterprise platform 120, as well as to support communication between the enterprise platform 120 and connected devices (e.g., client devices 102) and/or other related systems and devices not explicitly shown.

Users may refer to customers, clients and/or administrators of computing environments for which anomalies are being analyzed and addressed. For example, in some embodiments, the client devices 102 are assumed to be associated with repair technicians, system administrators, information technology (IT) managers, software developers, release management personnel or other authorized personnel configured to access and utilize the enterprise platform 120.

The information processing system 100 further includes technical support channels 103-1, 103-2, . . . 103-N (collectively "technical support channels 103") connected to the client devices 102 and to the enterprise platform 120 via the network 104. The technical support channels 103 comprise, for example, CRM and ITSM systems. According to one or more embodiments, a CRM and/or ITSM system includes technical support personnel (e.g., agents) tasked with assisting users that experience issues with their devices, systems, software, firmware, etc. Users such as, for example, customers, may contact the technical support personnel when they have device and/or system problems and require technical assistance to solve the problems. Technical support personnel may also receive support requests from the client devices 102 and/or enterprise platform 120. The support requests may comprise, for example, support tickets or other data summarizing the details and issues occurring on the client devices 102. The details of a support case may comprise, for example, a case title, a case description, affected device and/or device element details, and any other attributes that may be associated with a request for support. Agents for the technical support channels 103 may troubleshoot the client devices 102, diagnose any issues with the client devices 102 and find appropriate resolutions. Such resolutions may be, for example, software-based and/or hardware-based. Once a support case is resolved, data corresponding to the resolution, including, for example, the steps taken to resolve the issue and any parts or other elements that required replacement and/or installation along with the original details of the support case can be stored one or more databases associated with the technical support channels 103 as historical records. Details of the elements that required replacement and/or installation may comprise, for example, attributes and configurations for respective ones of the elements including, but not necessarily limited to, versions, model numbers, brands and/or compatibilities.

The network 104 is assumed to comprise a portion of a global computer network such as the Internet, although other types of networks can be part of the network 104, including a wide area network (WAN), a LAN, a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Each of the client devices 102-1, 102-2, . . . 102-M includes a client device management component 110-1, 110-2, . . . 110-M (collectively "client device management components 110"). For example, the client device management component 110-1 comprises a telemetry and state collection layer 111-1, an anomaly detection layer 112-1, a data compression layer 113-1, an alert generation and transmission layer 114-1 and a resolution data transmission layer 115-1. Like the client device management component 110-1, the client device management components 110-2, . . . 110-M each include respective instances of the telemetry and state collection layer 111-2, . . . 111-M, anomaly detection layer 112-2, . . . 112-M, data compression layer 113-2, . . . 113-M, alert generation and transmission layer 114-2 ... 114-M and resolution data transmission layer 115-2 ... 115-M.

The client device management components 110 comprise client side software that runs on the client devices 102. The telemetry and state collection layers 111 periodically collect operational data of the client devices 102 comprising, for example, device state and device telemetry data.

As used herein, "telemetry data" is to be broadly construed to include, for example, performance metrics such as, but not necessarily limited to, throughput, latency, memory capacity and usage, response and completion time, communication failures, temperature, channel capacity and bandwidth or other types of data which may be collected via, for example, sensors or other equipment or software associated with a client device 102.

As used herein, "state data" is to be broadly construed to include, for example, information capturing a status of a device at a given point in time. Device state can include, but is not necessarily limited to, the health of the device or its firmware and whether the device is operational.

According to one or more embodiments, the client device management components 110 continuously collect the telemetry and state data from the client devices 102 via Simple Network Management Protocol (SNMP) traps, and the alert generation and transmission layers 114 transmit alerts to the enterprise platform 120. The alerts correspond to anomalies that may be occurring on the client devices 102, and which are detected by the anomaly detection layers 112.

As used herein, "anomaly," "anomalies," or "anomalous events" are to be broadly construed to include, for example, a device failure and/or a problem or issue with a device's operation for which an alert may be generated. Such failures and/or problems or issues include, but are not necessarily limited to, component or interoperability malfunctions, scan failures, read failures, write failures, memory failures, high component temperatures (e.g., exceeding a given temperature threshold), high levels of paging activity (e.g., exceeding a given activity threshold), crashes of the components (e.g., kernel and hard drive crashes), booting issues and address changes (e.g., media access control address (MAC address) changes). The alerts may include details about the component that failed and/or had an issue with its operation. Such details may comprise, for example, identifiers (e.g., world-wide names (WWNs), world-wide port names (WWPNs) world-wide node names (WWNNs)), location codes, serial numbers, logical partition (LPAR) and virtual machine (VM) identifiers and/or names and Internet Protocol (IP) addresses and/or names.

As explained further herein, based on analysis performed by the enterprise platform 120 regarding whether the anomalies will automatically resolve, the enterprise platform 120 may create automatic resolution flags to avoid the creation of spurious support requests, or create support requests based on the alerts, which are sent to one or more technical support channels 103 and assigned to technical support agents for resolution.

As used herein, "automatic" or "automatically" are to be broadly construed to include, for example, tasks and/or processes which are self-regulating, automated, self-acting such as, for example, being performed without user or agent intervention and/or by a machine.

Figure 2:
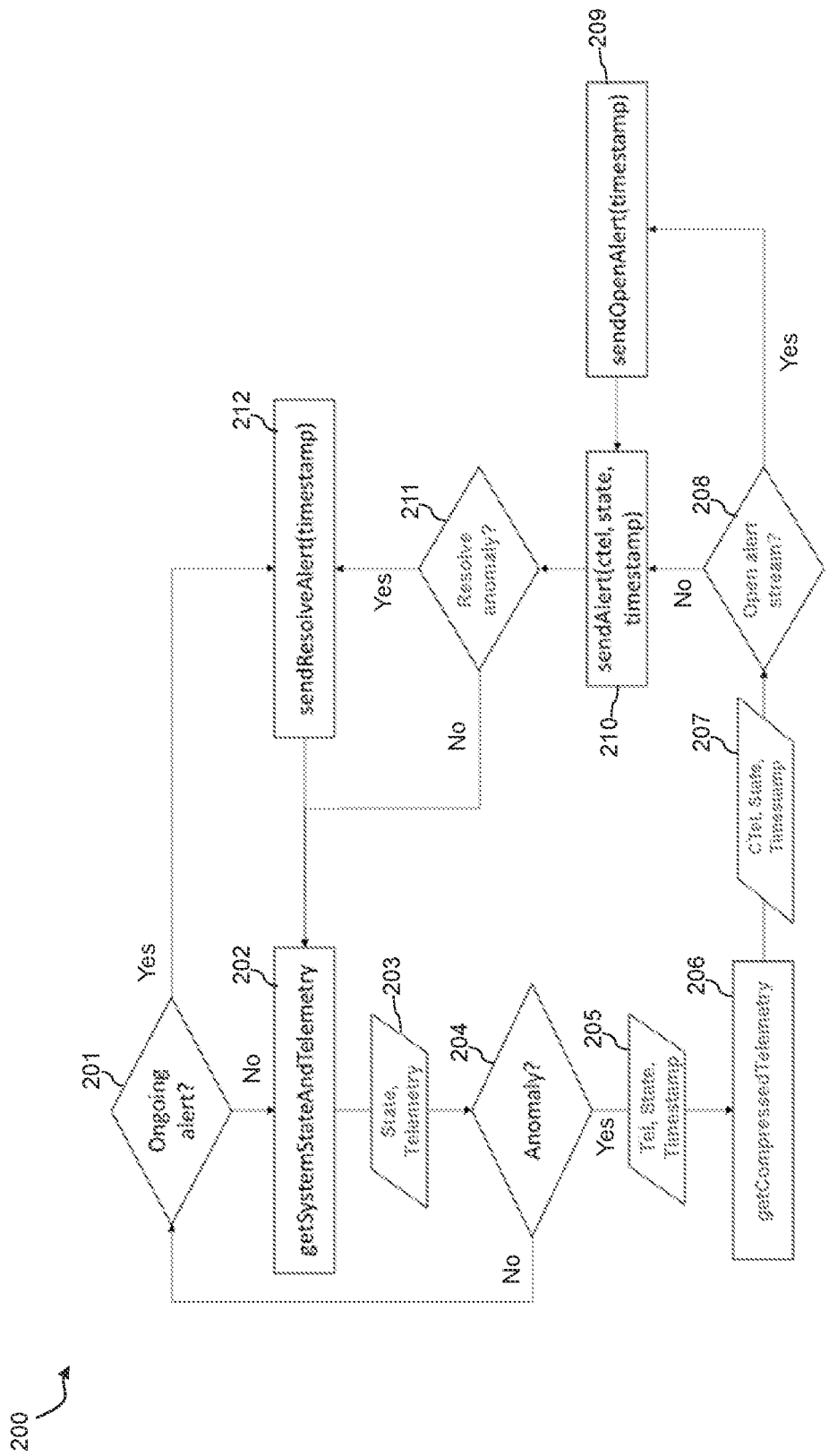
FIG. 2 depicts details of an operational flow for a client device management component of the intelligent anomaly detection system according to an illustrative embodiment.
Figure 3:
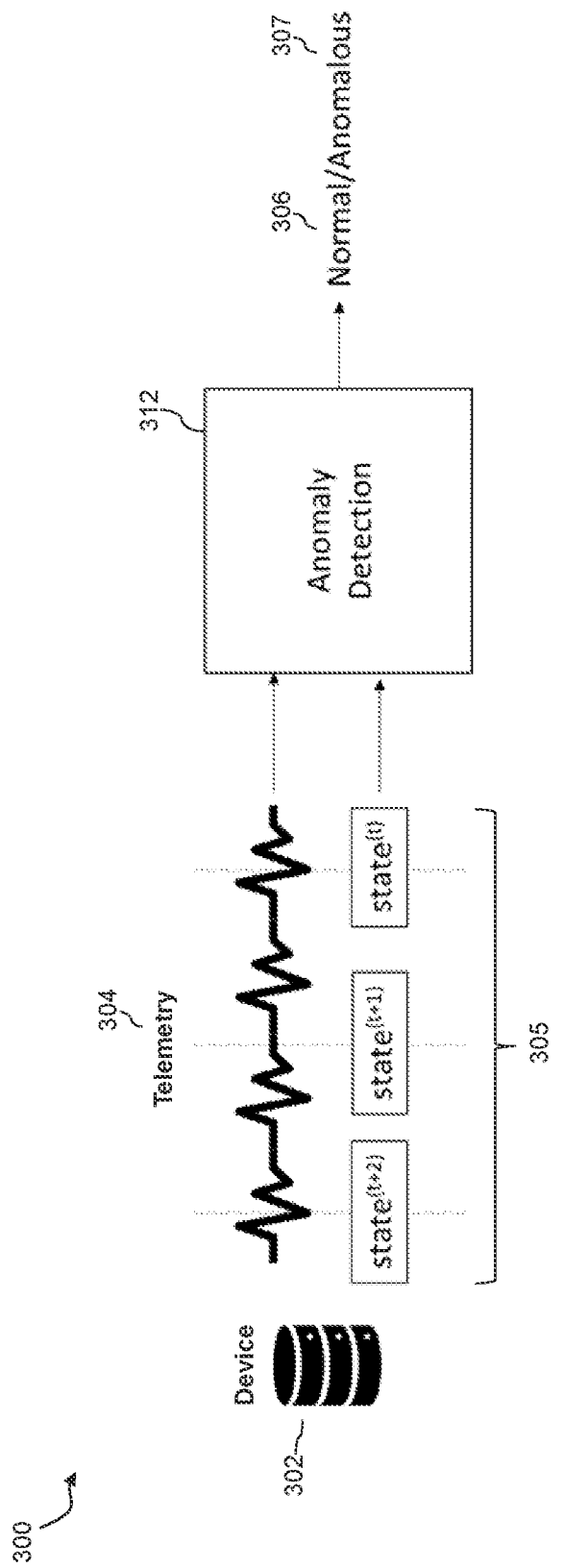
FIG. 3 depicts details of an operational flow for anomaly detection based on device state and telemetry data according to an illustrative embodiment.

Referring to the getSystemStateAndTelemetry block 202 in the operational flow 200 of FIG. 2, the telemetry and state collection layers 111 continuously collect the state of their corresponding client devices 102 and their aggregate telemetry data (state, telemetry block 203) at regular intervals, via one or more SNMP traps. Referring to block 204, the anomaly detection layers 112 identify anomalous events from the collected device states and telemetry 203. The anomaly detection layers 112 utilize a machine learning model trained to detect abnormal patterns in telemetry and states of a corresponding client device 102. Referring, for example, to the operational flow 300 in FIG. 3, the anomaly detection layer 312 (which is the same or similar to anomaly detection layer 112 in FIG. 1) of a client device management component (e.g., one of the client device management components 110) receives as inputs both the telemetry data 304 and state data 305 of a device 302 and yields as outputs a "normal" flag 306 or an "anomalous" flag 307 depending on whether the anomaly detection layer 312 identifies an anomaly in the telemetry and state data 304 and 305. As can be seen in FIG. 3, the telemetry and state data 304 and 305 are collected over a given time period. For example, the state data at times t+2, t+1 and t over a given time interval, where t is the most recent time, and corresponding telemetry data are collected by a telemetry and state collection layer, and input to the anomaly detection layer 312. According to one or more embodiments, the telemetry data 304 is proactively and continuously collected by the telemetry and state collection layer, and used in the anomaly detection process. This is an improvement over conventional approaches where telemetry data is not proactively collected and collected only after anomalous behavior is determined.

If an anomaly is detected (Yes at block 204), the alert generation and transmission layer 114 of a client device management component 110 sends an alert that an anomaly has been detected to the enterprise platform 120 and sends data that the enterprise platform 120 uses to predict whether the anomaly will automatically resolve. Similar to the client devices 102, the enterprise platform 120 includes a device management component 130. The enterprise device management component 130 comprises an anomaly data collection layer 131, a data decompression layer 132, an alert stream creation and modification layer 133, a resolution prediction layer 134, a resolution data analysis layer 135 and a message and flag generation layer 136.

The alert that an anomaly has been detected and the data that the enterprise platform 120 uses to predict whether the anomaly will automatically resolve is received by the anomaly data collection component 131. According to the embodiments, referring to block 205 in FIG. 2, the data that the enterprise platform 120 uses to predict whether an anomaly for a given will automatically resolve comprises telemetry data for the given device, a latest state of the given device, and a timestamp indicating when the anomaly was identified.

Referring to the getCompressedTelemetry block 206 in the operational flow 200, in order to improve data transmission performance, the telemetry data is compressed on the client side by a data compression layer 113 of a corresponding client device management client component 110. The compressed telemetry data, state data and timestamp data (block 207) are sent to the enterprise platform 120 via, for example, the alert generation and transmission layer 114. According to an embodiment, the client device management component 110 uses a time-series compression mechanism to compress the telemetry data. The time-series compression techniques results in high compression ratios with a relatively low computational cost. Referring to block 207, the compressed telemetry data, the device state and the timestamp are then packaged and sent to the enterprise platform 120 and received by the anomaly data collection component 131.

Referring to the sendAlert block 210 in FIG. 2, as long as anomalous behavior is detected from the continuous telemetry data and state data collection, the client device management components 110 will continue to send the collected data (e.g., compressed telemetry data, state data and timestamp data) to the enterprise device management component 130. According to one or more embodiments, the collected data is transmitted to the enterprise platform 120 in the form of a data stream. Referring to block 208 in FIG. 2, the device management client component 110 evaluates whether the data relates to a first data submission after the detection of anomalous behavior. If the data relates to a first data submission after the detection of anomalous behavior and a new alert stream should be opened (Yes), the flow proceeds to block 209 (sendOpenAlert) where the device management client component 110 opens an alert data stream for the first data submission, and sends to the enterprise device management component 130 component an instruction to open an alert data stream and a timestamp indicating when the anomalous behavior was first detected. The enterprise data management component 130 is configured to listen for instructions from the device management client component 110 to open an alert data stream. If at block 208, the data does not relate to a first data submission after the detection of anomalous behavior and an alert stream already exists (No), the flow proceeds to block 210 where the client device management components 110 continue to send the collected data to the enterprise device management component 130 (e.g., for situations where previous data submissions for identified anomalous behavior already occurred).

Once anomaly resolution occurs, the client device management component 110 will cease to detect anomalous behavior and instruct the enterprise device management component 130 to close an alert stream and send a timestamp of the resolution to the enterprise device management component 130. Referring to block 211, if a client data management component 110 determines that a detected anomaly has been resolved (Yes at block 211), the flow proceeds to block 212 (sendResolveAlert (timestamp)), where the resolution data transmission layer 115 of the client data management component 110 transmits an instruction to the enterprise device management component 130 to close the alert data stream corresponding to the resolved anomaly. In addition, the resolution data transmission layer 115 transmits a timestamp of when the anomaly resolution occurred to the enterprise device management component 130. The data transmitted from the resolution data transmission layer 115 is received by the resolution data analysis layer 135. Alternatively, at block 211, if it is determined that a detected anomaly has not been resolved (No at block 211), the flow proceeds back to block 202, where state and telemetry data collection continues.

Referring to block 201 in the operational flow 200 of FIG. 2, a determination is made whether there is an on-going (e.g., existing) alert/issue. For example, referring to block 204, when the anomaly detection layer 112 determines that there is no anomalous event from the collected device states and telemetry 203 (No response to block 204), at block 201, there is a query whether there is a prior existing alert related to the collected device states and telemetry. If such an on-going alert exists (Yes response to block 201), the system resolves this alert by calling a sendResolveAlert message (block 212). In other words, if there is an open alert for a device when the device returns to normal operation, the flow proceeds to block 212 (sendResolveAlert (timestamp)), where a flag is generated indicating the alert resolution. If there is no on-going alert, the flow proceeds to block 202, where the telemetry and state collection layers 111 continuously collect device state data and telemetry data.

Figure 4:
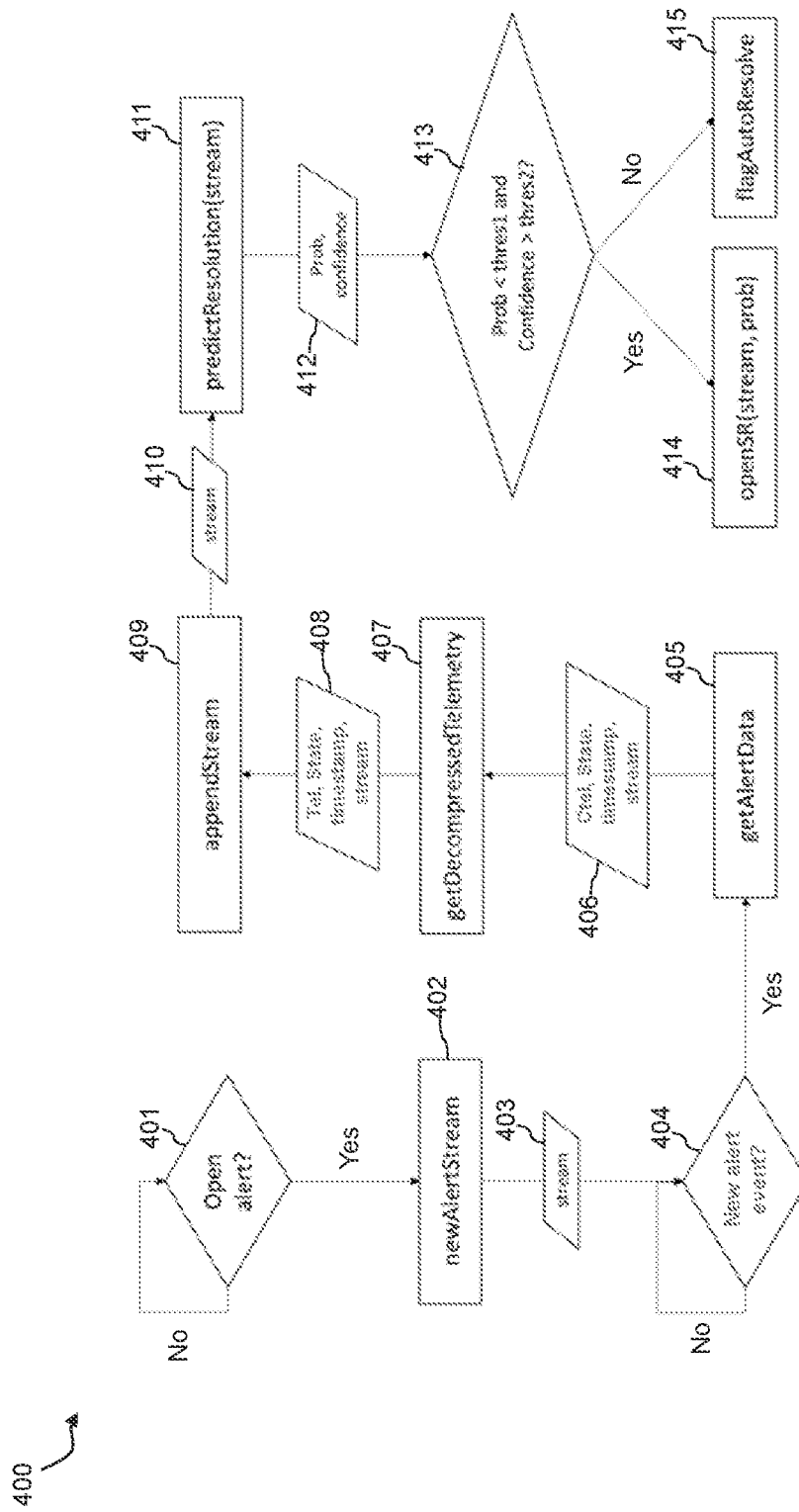
FIG. 4 depicts details of an operational flow for an enterprise device management component according to an illustrative embodiment.

Referring to FIGS. 1 and 4, the enterprise platform 120 comprising the enterprise device management component 130 connects with all deployed client device management component instances 110 to continuously receive information about the operation of client devices 102. FIG. 4 illustrates an operational flow 400 for operation of the enterprise device management component 130. For every connected client device management component 110, the enterprise device management component 130 remains in a waiting state, listening for instructions from the client device management component instances 110 to, for example, open a new alert data stream. As noted herein, the instructions can be sent via the sendOpenAlert operation (block 209 in FIG. 2). Referring to block 401 of FIG. 4, the enterprise device management component 130 listens for an instruction to open a new alert data stream. If the instruction is received (Yes at block 401), the flow proceeds to block 402, where the alert stream creation and modification layer 133 of the enterprise device management component 130 opens a new data alert stream 403. According to one or more embodiments, the new alert stream is embedded in the timestamp indicating when the anomalous behavior was first detected. If no instruction is received to open a new alert stream (No at block 401), the enterprise device management component 130 continues to listen for instructions to open the new alert data stream.

Referring to block 404, following opening of a new data alert stream, the enterprise device management component 130 starts a new listening thread that waits for incoming alert events sent by the connected client device management component instances 110. If no incoming alert events are received (No at block 404), the enterprise device management component 130 continues to listen for incoming alert events. If incoming alert events are received (Yes at block 404), the flow proceeds to block 405. Referring to the getAlertData and getDecompressedTelemetry blocks 405 and 407, the anomaly data collection and data decompression components 131 and 132 of the enterprise device management component 130 respectively unpack the data corresponding to the detected anomaly (Ctel, state, timestamp stream 406) and decompress the telemetry data. The client data management component instances 110 and the enterprise device management component 130 agree on a compression algorithm. Since the enterprise device management component 130 keeps the alert events in a stream, the telemetry data's time-series can be fully reconstructed at the enterprise end via the time-series decompression technique.

Referring to the appendStream block 409, the decompressed telemetry data and the rest of the anomaly-related data (Tel, state, timestamp stream 408) are appended to the open alert stream 410 by the alert stream creation and modification layer 133. Referring to the predictResolution block 411, the existing data stream(s) of alerts comprising the device states and associated telemetry data and timestamps sent by the client data management component instances 110 are input to the resolution prediction layer 134, which predicts the probability of automatic resolution of the anomalous behavior. A confidence score (block 412) is provided with each prediction. According to one or more embodiments, the resolution prediction layer 134 receives as input the most recent device states and associated telemetry data sent by a given client data management component 110.

The prediction is generated using a machine learning model trained in a supervised fashion with historical data relating anomalies in alert streams to class labels indicating whether those anomalies automatically resolved. The confidence score is a measure of statistical significance of the predicted probability and is a function of the temporal length of the stream. A higher confidence score results from more telemetry data and states available for the prediction.

Referring to block 413 of FIG. 4, the message and flag generation layer 136 of the enterprise device management component 130 analyzes the machine learning model outputs to determine whether a support request (SR) will be opened for that alert. Referring to the OpenSR block 414, an SR will be opened only if the predicted probability of resolution is below a first pre-defined threshold value (thresh1) and the confidence in the prediction is above a second pre-defined threshold (thresh2) (Yes). In this case, the message and flag generation layer 136 sends a message to one or more technical support channels 103 with the SR to address the anomaly. Otherwise, referring to block 415, if the conditions for the first and second threshold values are not met (No), the enterprise device management component 130 determines that the alert will probably automatically resolve. In this case, the message and flag generation layer 136 does not send an SR to a technical support channel 103, and instead generates an automatic resolution flag indicating that the anomaly will resolve without technical support or other user intervention. For example, if the predicted probability of resolution is above the first pre-defined threshold value (thresh1) and the confidence in the prediction is also above the second pre-defined threshold (thresh2), the message and flag generation layer 136 generates the automatic resolution flag. Following the generation of the automatic resolution flag, the enterprise device management component 130 returns to a listening state for more data. The threshold values (thresh1 and thresh2) can be user-defined and/or learned from the data.

Figure 5:
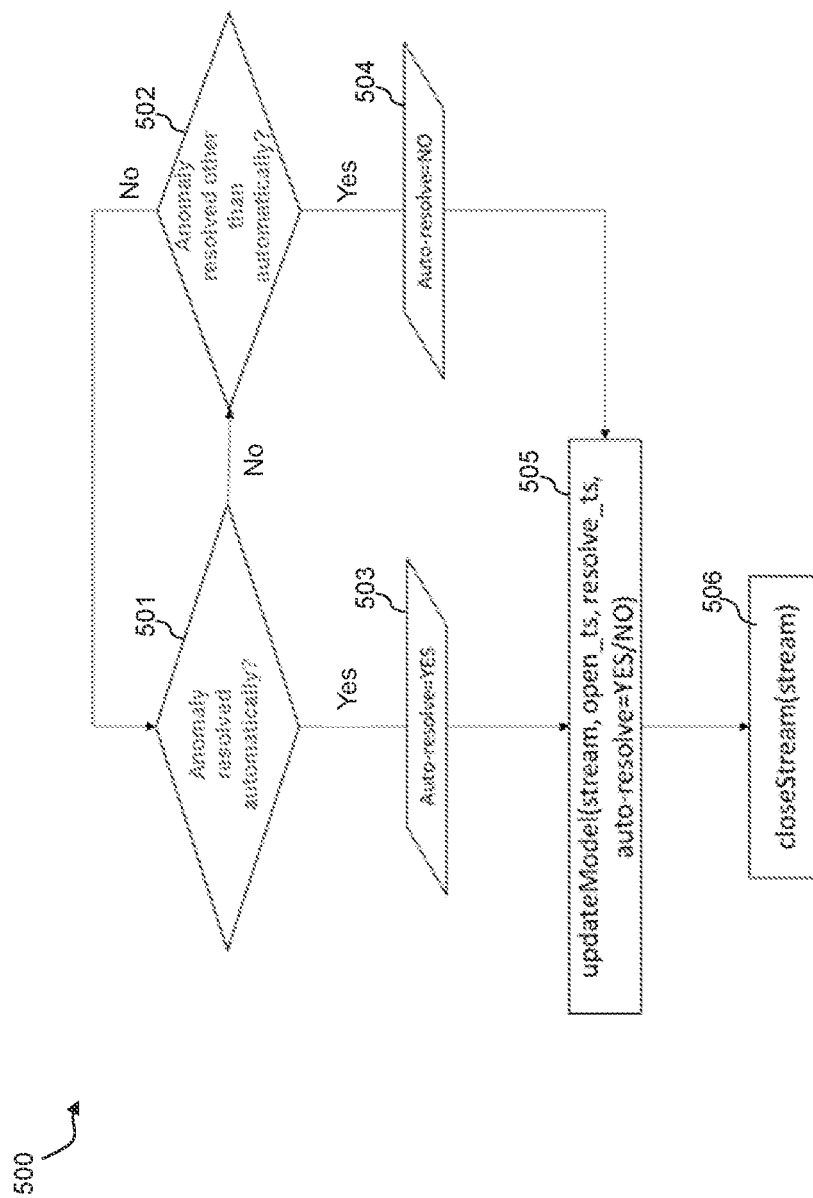
FIG. 5 depicts details of an operational flow for updating a prediction model following anomalous event resolution according to an illustrative embodiment according to an illustrative embodiment.

Referring to FIG. 1 and to the operational flow 500 in FIG. 5, when a resolution is sent from a client data management component 110 (e.g., by the resolution data transmission layer 115) and received by the enterprise device management component 130, the enterprise device management component 130 and, more particularly, the resolution data analysis layer 135, analyzes the received resolution to determine whether the anomaly was resolved automatically (block 501) or not resolved automatically (e.g., by an agent or other non-automated means) (block 502). Referring to the updateModel block 505, in order to further train the prediction machine learning model, the enterprise device management component 130 updates the prediction machine learning model using the currently open stream for a given device in, timestamps for the open and close events, and a label (503 or 504) indicating whether the anomaly automatically resolved. Following the update, referring to block 506, the data stream is closed since the anomaly was resolved. The enterprise device management component 130 maintains a historical database of states and telemetry data of all the monitored client devices. Such a database is incremented with new data as anomalies are resolved, so that the automatic resolution prediction model can be regularly updated and retrained.

According to one or more embodiments, the databases or other storage elements used herein can be configured according to a relational database management system (RDBMS) (e.g., PostgreSQL). Databases and/or storage platforms in some embodiments are implemented using one or more storage systems or devices associated with the client devices 102, technical support channels and/or enterprise platform 120. In some embodiments, one or more of the storage systems utilized to implement the databases and/or storage platforms comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the client devices 102 and enterprise platform 120, the device management components 110 and 130 in other embodiments can be implemented at least in part externally to the client devices 102 and/or enterprise platform 120, for example, as stand-alone servers, sets of servers or other types of systems coupled to the network 104. For example, the device management components 110 and 130 may be provided as cloud services accessible by the client devices 102 and/or enterprise platform 120.

The device management components 110 and 130 in the FIG. 1 embodiment are each assumed to be implemented using at least one processing device. Each such processing device generally comprises at least one processor and an associated memory, and implements one or more functional modules for controlling certain features of the device management components 110 and/or 130.

At least portions of client devices 102 and/or enterprise platform 120 and the components thereof may be implemented at least in part in the form of software that is stored in memory and executed by a processor. The client devices 102 and/or enterprise platform 120 and the components thereof comprise further hardware and software required for running the client devices 102 and/or enterprise platform 120, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the device management components 110 and 130 and other components of the client devices and enterprise platform 120 in the present embodiment are shown as part of the client devices 102 and enterprise platform 120, at least a portion of the device management components 110 and 130 and other components of the client devices 102 and enterprise platform 120 in other embodiments may be implemented on one or more other processing platforms that are accessible to the client devices and enterprise platform 120 over one or more networks. Such components can each be implemented at least in part within another system element or at least in part utilizing one or more stand-alone components coupled to the network 104.

It is assumed that the client devices 102 and enterprise platform 120 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the device management components 110 and 130 and other components of the client devices 102 and enterprise platform 120, and the elements thereof can each be implemented in the form of one or more LXCs running on one or more VMs. Other arrangements of one or more processing devices of a processing platform can be used to implement the device management components 110 and 130 as well as other components of the client devices 102 and enterprise platform 120. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the client devices 102 and/or enterprise platform 120 to reside in different data centers. Numerous other distributed implementations of the client devices 102 and/or enterprise platform 120 are possible.

Accordingly, one or each of the device management components 110 and 130 and other components of the client devices 102 and enterprise platform 120 can each be implemented in a distributed manner so as to comprise a plurality of distributed components implemented on respective ones of a plurality of compute nodes of the client devices 102 and/or enterprise platform 120.

It is to be appreciated that these and other features of illustrative embodiments are presented by way of example only, and should not be construed as limiting in any way.

Accordingly, different numbers, types and arrangements of system components such as the device management components 110 and 130 and other components of the client devices 102 and enterprise platform 120, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the device management components can be offered to cloud infrastructure customers or other users as part of FaaS, CaaS and/or PaaS offerings.

Figure 6:
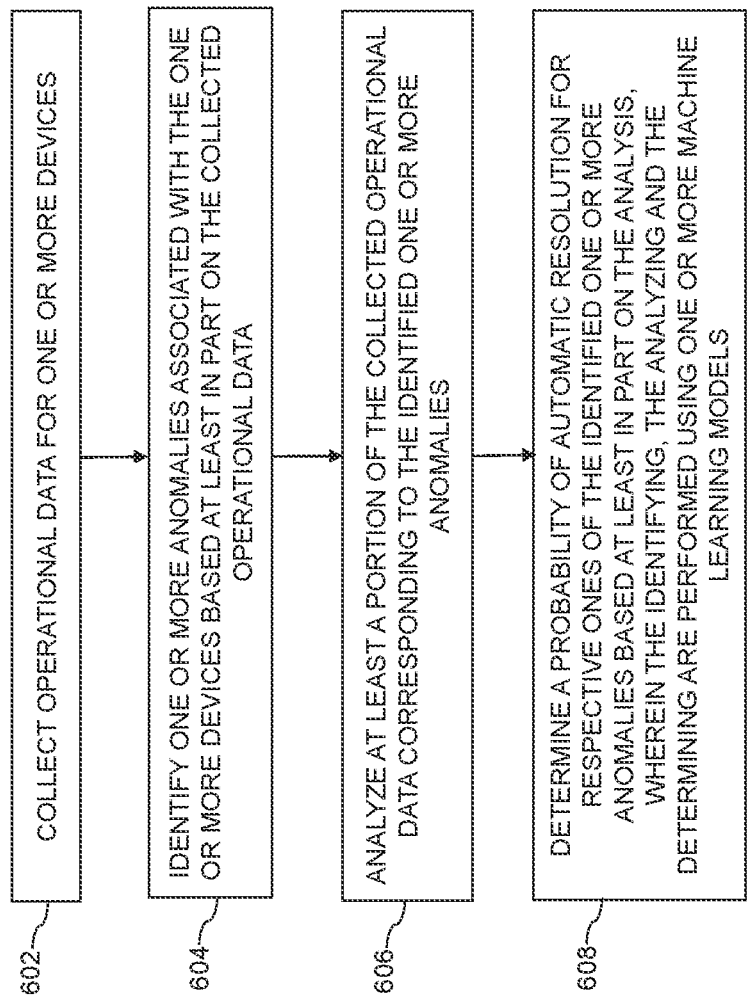
FIG. 6 depicts a process for detecting anomalous events and predicting resolution of the anomalous events according to an illustrative embodiment.

The operation of the information processing system 100 will now be described in further detail with reference to the flow diagram of FIG. 6. With reference to FIG. 6, a process 600 for detecting anomalous events and predicting resolution of the anomalous events as shown includes steps 602 through 608, and is suitable for use in the system 100 but is more generally applicable to other types of information processing systems comprising client and enterprise device management components configured for detecting anomalous events and predicting resolution of the anomalous events.

In step 602, operational data for one or more devices is collected. The collected operational data comprises state data and telemetry data for the one or more devices. The operational data is collected at predetermined intervals.

In step 604, one or more anomalies associated with the one or more devices are identified based at least in part on the collected operational data.

In step 606, at least a portion of the collected operational data corresponding to the identified one or more anomalies is analyzed, and in step 608, a probability of automatic resolution for respective ones of the identified one or more anomalies is determined based at least in part on the analysis. The identifying, the analyzing and the determining are performed using one or more machine learning models.

A confidence score for respective ones of the probabilities is computed. The process may further comprise generating a support request or a flag indicating an automatic resolution based on values of the respective ones of the probabilities and/or respective ones of the confidence scores.

At least the identifying is performed in a client environment and at least the determining is performed in an enterprise environment. In one or more embodiments, at least a portion of the telemetry data is compressed in the client environment, the compressed telemetry data is transmitted to the enterprise environment, and the compressed telemetry data is decompressed in the enterprise environment. The collected operational data may be transmitted from the client environment to the enterprise environment in one or more data streams.

A data management component in the client environment may determine that at least one anomaly of the one or more anomalies has been resolved, and an instruction to close a portion of the one or more data streams corresponding to the at least one anomaly may be transmitted from the client environment to the enterprise environment. A timestamp of the resolution of the at least one anomaly may also be transmitted from the client environment to the enterprise environment.

In one or more embodiments, an instruction to open a new data stream responsive to the identification of at least one anomaly of the one or more anomalies is transmitted from the client environment to the enterprise environment, and a data management component in the enterprise environment listens for the instruction. In illustrative embodiments, respective timestamps corresponding to the identification of the one or more anomalies are transmitted from the client environment to the enterprise environment.

In accordance with one or more embodiments, a determination is made whether at least one anomaly of the identified one or more anomalies has been resolved automatically, and the one or more machine learning models are trained with data indicating whether the at least one anomaly was resolved automatically. In addition, the one or more machine learning models may be trained with historical data indicating whether a plurality of anomalies were resolved automatically.

It is to be appreciated that the FIG. 6 process and other features and functionality described above can be adapted for use with other types of information systems configured to execute device management services in a client platform, enterprise platform or other type of platform.

The particular processing operations and other system functionality described in conjunction with the flow diagram of FIG. 6 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with client and enterprise device management components as disclosed herein can provide a number of significant advantages relative to conventional arrangements. For example, unlike conventional techniques, the embodiments advantageously use machine learning techniques to provide an innovative architecture to support an intelligent adaptive anomaly detection framework for devices, which not only detects anomaly events, but also predicts if the anomaly event will automatically resolve. Advantageously, the embodiments can dramatically reduce the creation of unnecessary support cases, thus reducing support costs.

Under conventional techniques, since many device errors may resolve on their own without intervention (e.g., automatically), a majority of the error alerts generated by existing systems can be considered false positive alerts. For example, a high load on a hard drive tends to increase the temperature of the drive, but the temperature decreases as the load reduces. Under current approaches, responsive to the increase in hard drive temperature, an alert is generated resulting in the unnecessary generation of a support case, the unnecessary collection of device data and the unnecessary assignment of the case to a technical support agent since the hard drive returns to normal operation once the load abates. As can be understood, conventional techniques result in a high a volume of support cases for non-existent (e.g., automatically resolved) errors.

Unlike conventional techniques, the embodiments prevent the opening of unnecessary support requests by using machine learning techniques to predict anomalous events and the probability of their automatic resolution. As an additional advantage, the embodiments provide for the management of compressed telemetry streams in-between opening and closing failure alert events, and proactively and continuously collect system telemetry data prior to detecting anomalous events.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the enterprise platform 120 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an enterprise platform in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
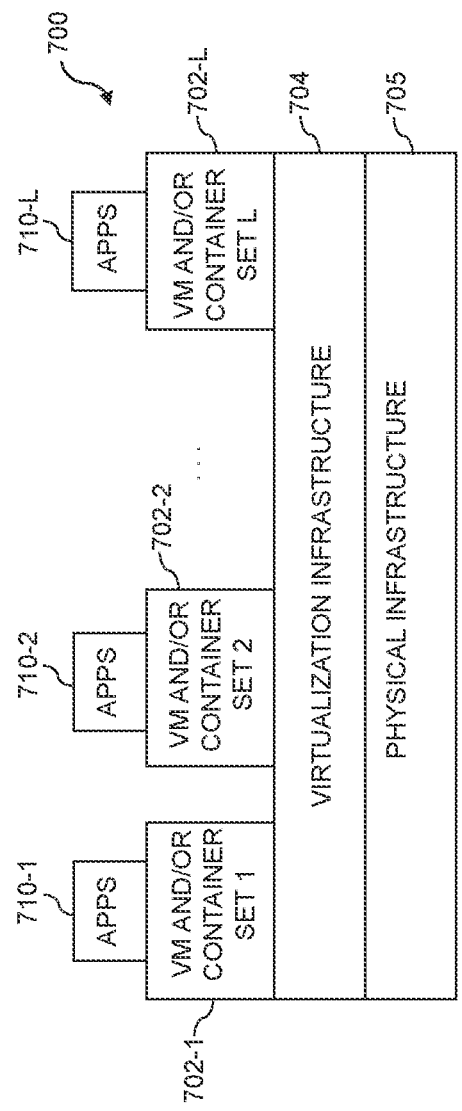
FIGS. 7 and 8 show examples of processing platforms that may be utilized to implement at least a portion of an information processing system according to illustrative embodiments.
Figure 8:
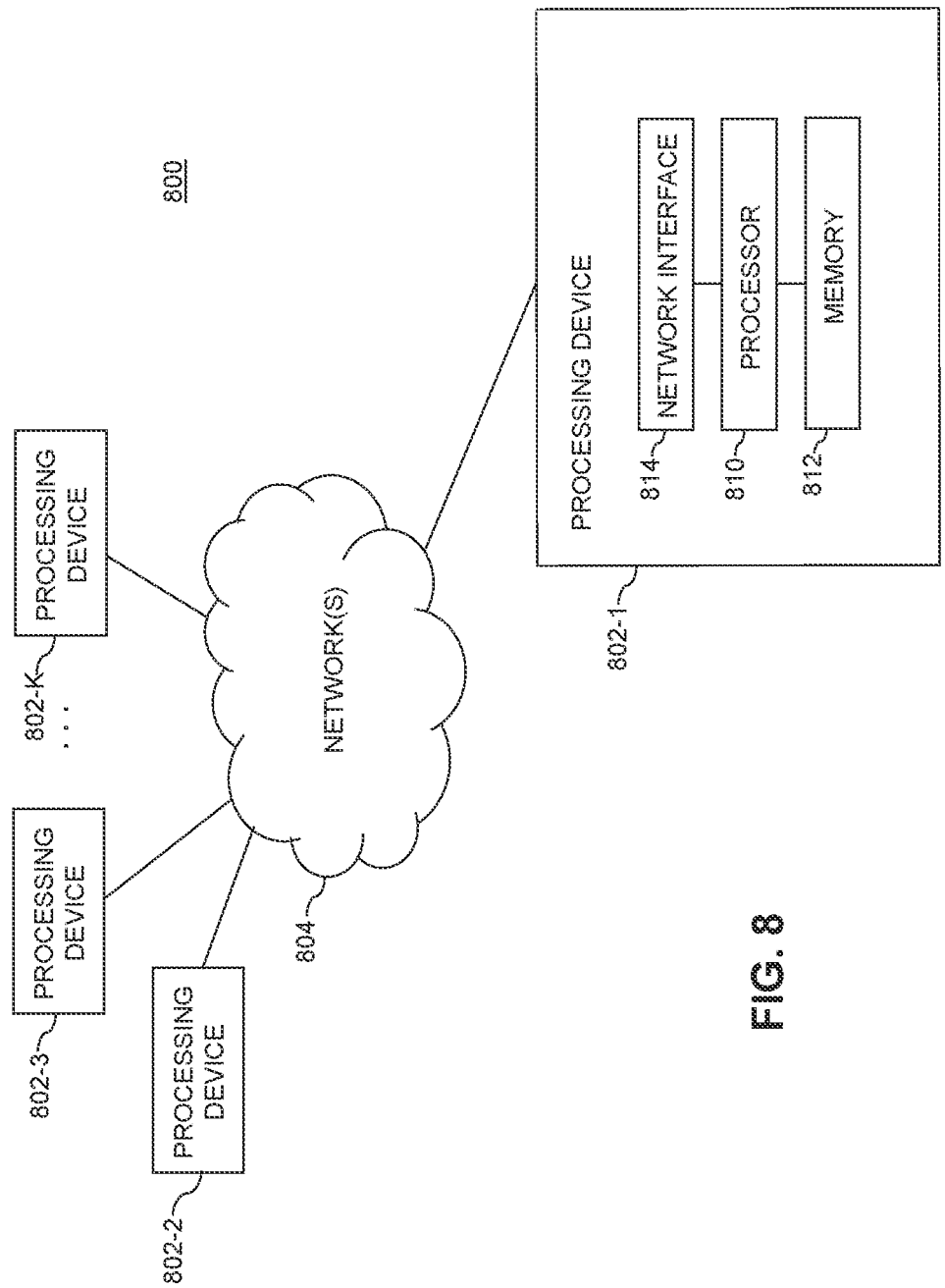

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-P, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the client devices 102 and/or the enterprise platform 120 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and enterprise platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to receive operational data for one or more devices, wherein the operational data identifies one or more anomalies associated with the one or more devices;
   to open one or more data streams corresponding to the one or more anomalies based at least in part on the operational data;
   to analyze at least a portion of the operational data corresponding to the one or more anomalies;
   to determine, using one or more machine learning models, probabilities of automatic resolution for respective ones of the one or more anomalies based at least in part on the analysis;
   to generate one or more support requests for at least a subset of the one or more anomalies based at least in part on the determined probabilities;
   to determine that at least one anomaly of the one or more anomalies has been resolved; and
   to close a portion of the one or more data streams corresponding to the at least one anomaly.

2. The apparatus of claim 1 wherein the operational data comprises state data and telemetry data for the one or more devices.

3. The apparatus of claim 2 wherein the operational data is received at predetermined intervals.

4. The apparatus of claim 1 wherein the operational data is collected and transmitted from a client environment to an enterprise environment.

5. The apparatus of claim 4 wherein:
the operational data comprises state data and telemetry data for the one or more devices; and
said at least one processing platform is further configured:
to compress at least a portion of the telemetry data in the client environment;
to receive the compressed telemetry data in the enterprise environment; and
to decompress the compressed telemetry data in the enterprise environment.

6. The apparatus of claim 4 wherein said at least one processing platform is further configured to receive from the client environment an instruction to close the portion of the one or more data streams corresponding to the at least one anomaly.

7. The apparatus of claim 4 wherein said at least one processing platform is further configured to receive a timestamp of the resolution of the at least one anomaly from the client environment.

8. The apparatus of claim 4 wherein said at least one processing platform is further configured:
to receive from the client environment an instruction to open the one or more data streams; and
to listen for the instruction in the enterprise environment.

9. The apparatus of claim 4 wherein said at least one processing platform is further configured to receive from the client environment respective timestamps corresponding to when the one or more anomalies were identified.

10. The apparatus of claim 1 wherein said at least one processing platform is further configured to compute a confidence score for respective ones of the determined probabilities.

11. The apparatus of claim 10 wherein said at least one processing platform is further configured to generate a flag indicating an automatic resolution based on values of at least one of the respective ones of the determined probabilities and respective ones of the confidence scores.

12. The apparatus of claim 1 wherein said at least one processing platform is further configured:
to determine whether the at least one anomaly has been resolved automatically; and
to train the one or more machine learning models with data indicating whether the at least one anomaly was resolved automatically.

13. The apparatus of claim 1 wherein said at least one processing platform is further configured to train the one or more machine learning models with data indicating whether a plurality of anomalies were resolved automatically.

14. A method comprising:
receiving operational data for one or more devices, wherein the operational data identifies one or more anomalies associated with the one or more devices;
opening one or more data streams corresponding to the one or more anomalies based at least in part on the operational data;
analyzing at least a portion of the operational data corresponding to the one or more anomalies;
determining, using one or more machine learning models, probabilities of automatic resolution for respective ones of the one or more anomalies based at least in part on the analysis;
generating one or more support requests for at least a subset of the one or more anomalies based at least in part on the determined probabilities;
determining that at least one anomaly of the one or more anomalies has been resolved; and
closing a portion of the one or more data streams corresponding to the at least one anomaly;
wherein the method is performed by at least one processing platform comprising at least one processing device comprising a processor coupled to a memory.

15. The method of claim 14 wherein the operational data is collected and transmitted from a client environment to an enterprise environment.

16. The method of claim 15 further comprising
receiving from the client environment an instruction to close the portion of the one or more data streams corresponding to the at least one anomaly.

17. A computer program product comprising a non-transitory processor-readable storage medium having stored therein program code of one or more software programs, wherein the program code when executed by at least one processing platform causes said at least one processing platform:
to receive operational data for one or more devices, wherein the operational data identifies one or more anomalies associated with the one or more devices;
to open one or more data streams corresponding to the one or more anomalies based at least in part on the operational data;
to analyze at least a portion of the operational data corresponding to the one or more anomalies;
to determine, using one or more machine learning models, probabilities of automatic resolution for respective ones of the one or more anomalies based at least in part on the analysis;
to generate one or more support requests for at least a subset of the one or more anomalies based at least in part on the determined probabilities;
to determine that at least one anomaly of the one or more anomalies has been resolved; and
to close a portion of the one or more data streams corresponding to the at least one anomaly.

18. The computer program product according to claim 17 wherein the operational data is collected and transmitted from a client environment to an enterprise environment.

19. The computer program product according to claim 18 wherein the program code further causes said at least one processing platform to receive from the client environment an instruction to close the portion of the one or more data streams corresponding to the at least one anomaly.

20. The computer program product according to claim 17 wherein said at least one processing platform is further configured:
to determine whether the at least one anomaly has been resolved automatically; and
to train the one or more machine learning models with data indicating whether the at least one anomaly was resolved automatically.

* * * * *